United States Patent [19]

Haas et al.

[11] Patent Number: 5,368,199
[45] Date of Patent: Nov. 29, 1994

[54] MICROWAVEABLE HOT MELT DISPENSER

[75] Inventors: Hans E. Haas, Stow, Ohio; Bernard M. Malofsky, Bloomfield; Richard T. Thompson, Haddam, both of Conn.; Cynthia R. Jaros, Kirtland, Ohio; John R. Nottingham, Hunting Valley, Ohio; John Spirk, Moreland Hills, Ohio; Craig M. Saunders, Rocky River, Ohio; Paul E. Brokaw, Euclid, Ohio

[73] Assignees: Loctite Corporation, Hartford, Conn.; Nottingham-Spirk Design Associates, Inc., Cleveland, Ohio

[21] Appl. No.: 200,852

[22] Filed: Feb. 22, 1994

Related U.S. Application Data

[63] Continuation of Ser. No. 20,511, Feb. 22, 1993, abandoned, which is a continuation-in-part of Ser. No. 562,518, Aug. 6, 1990, Pat. No. 5,188,256.

[51] Int. Cl.$^5$ .......................... H05B 6/64; B67D 5/62
[52] U.S. Cl. ................ 222/146.5; 219/679; 219/759
[58] Field of Search .............. 222/1, 146.5, 103; 219/10.55 A–10.55 R, 679, 759; 426/107, 243, 241, 242; 99/DIG. 14; 156/272.2

[56] References Cited

U.S. PATENT DOCUMENTS

| 1,242,165 | 10/1917 | Fitzgerald | 222/103 |
|---|---|---|---|
| 2,830,162 | 4/1958 | Copson et al. | 219/10.41 |
| 2,857,079 | 10/1958 | Hall | 222/103 |
| 3,262,605 | 7/1966 | Madden et al. | 222/103 |
| 3,620,876 | 11/1971 | Guglielmo et al. | 156/272 |
| 3,831,815 | 8/1974 | Glasgow | 222/94 |
| 3,858,985 | 1/1975 | Fiveash | 401/2 |
| 4,003,840 | 1/1977 | Oshino et al. | 252/62 |
| 4,230,924 | 10/1980 | Brastad et al. | 219/10.55 |
| 4,253,898 | 3/1981 | Rinker et al. | 156/272 |
| 4,267,420 | 5/1981 | Brastad | 219/10.55 |
| 4,283,427 | 8/1981 | Winters et al. | 426/107 |
| 4,421,973 | 12/1983 | Lou | 219/301 |
| 4,566,804 | 1/1986 | Collins et al. | 374/14 |
| 4,626,642 | 12/1986 | Wang et al. | 219/10.55 |
| 4,801,777 | 1/1989 | Auerbach | 219/10.55 |
| 4,808,780 | 2/1989 | Seaborne | 219/10.55 |
| 4,841,112 | 6/1989 | Peleg | 219/10.55 |
| 4,864,090 | 9/1989 | Maxwell et al. | 219/10.55 |
| 4,906,497 | 3/1990 | Hellmann et al. | 428/49 |
| 4,926,029 | 5/1990 | Pearson | 219/421 |
| 4,934,561 | 6/1990 | Ness et al. | 222/1 |
| 4,969,968 | 11/1990 | Leatherman | 156/272.4 |
| 4,970,358 | 11/1990 | Brandberg et al. | 219/10.55 |
| 4,988,841 | 1/1991 | Pesheck et al. | 219/10.55 |
| 5,002,792 | 3/1991 | Vegoe | 427/2 |
| 5,019,680 | 5/1991 | Morino et al. | 219/10.55 |
| 5,079,397 | 1/1992 | Keefer | 219/10.55 |
| 5,128,388 | 7/1992 | Komori et al. | 522/95 |
| 5,164,562 | 11/1992 | Huffman et al. | 219/10.55 E |
| 5,177,332 | 1/1993 | Fong | 219/10.55 E |
| 5,188,256 | 2/1993 | Nottingham et al. | 222/1 |
| 5,241,150 | 8/1993 | Garvey et al. | 219/10.55 E |

FOREIGN PATENT DOCUMENTS

| 0421710 | 4/1991 | European Pat. Off. | H05B 6/64 |
|---|---|---|---|
| 0498998 | 8/1992 | European Pat. Off. | B29C 35/08 |
| 92/09503 | 6/1992 | WIPO | B65D 81/34 |
| 93/01247 | 1/1993 | WIPO | C09J 5/06 |

Primary Examiner—Andres Kashnikow
Assistant Examiner—Kenneth DeRosa
Attorney, Agent, or Firm—Eugene F. Miller; Edward K. Welch, II; Radhika P. Raju

[57] ABSTRACT

The present invention relates to improvements in the design and construction of apparatus for dispensing microwaveable hot melt adhesives and other heat sensitive materials. The apparatus comprises a dispenser which is heated by microwaves and then used to dispense a material therefrom. The dispenser is specifically designed to convert microwave energy into heat and to transfer the heat to the material to be dispensed in a more efficient and/or safe manner.

48 Claims, 5 Drawing Sheets

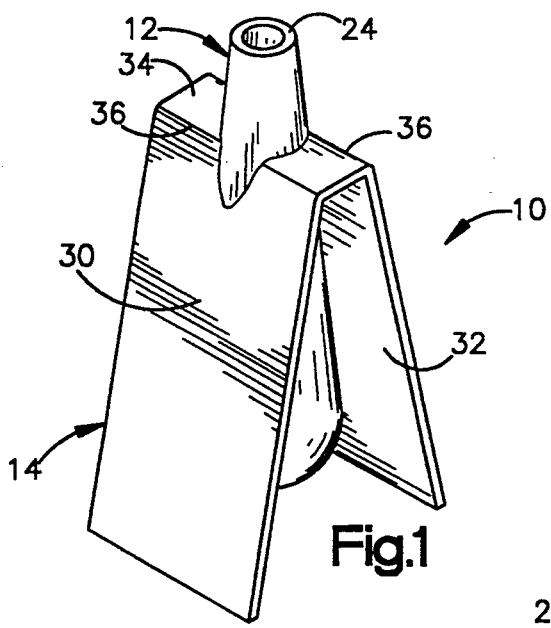
Fig.1
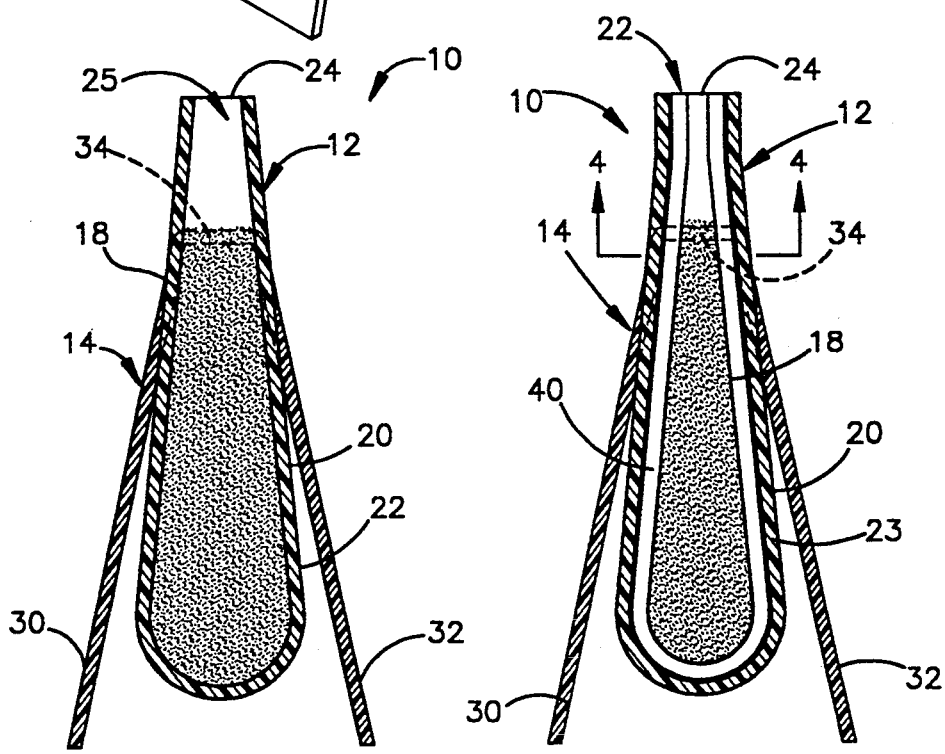
Fig.2
Fig.3
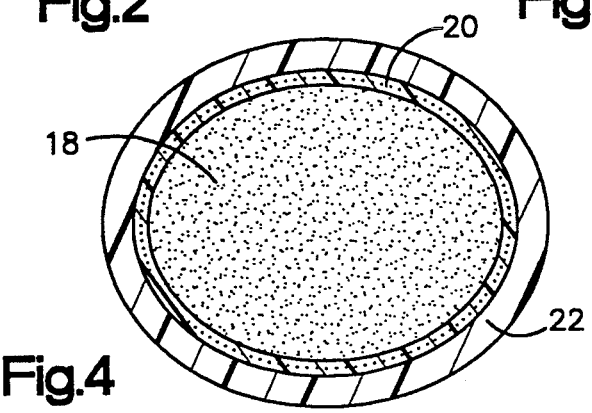
Fig.4

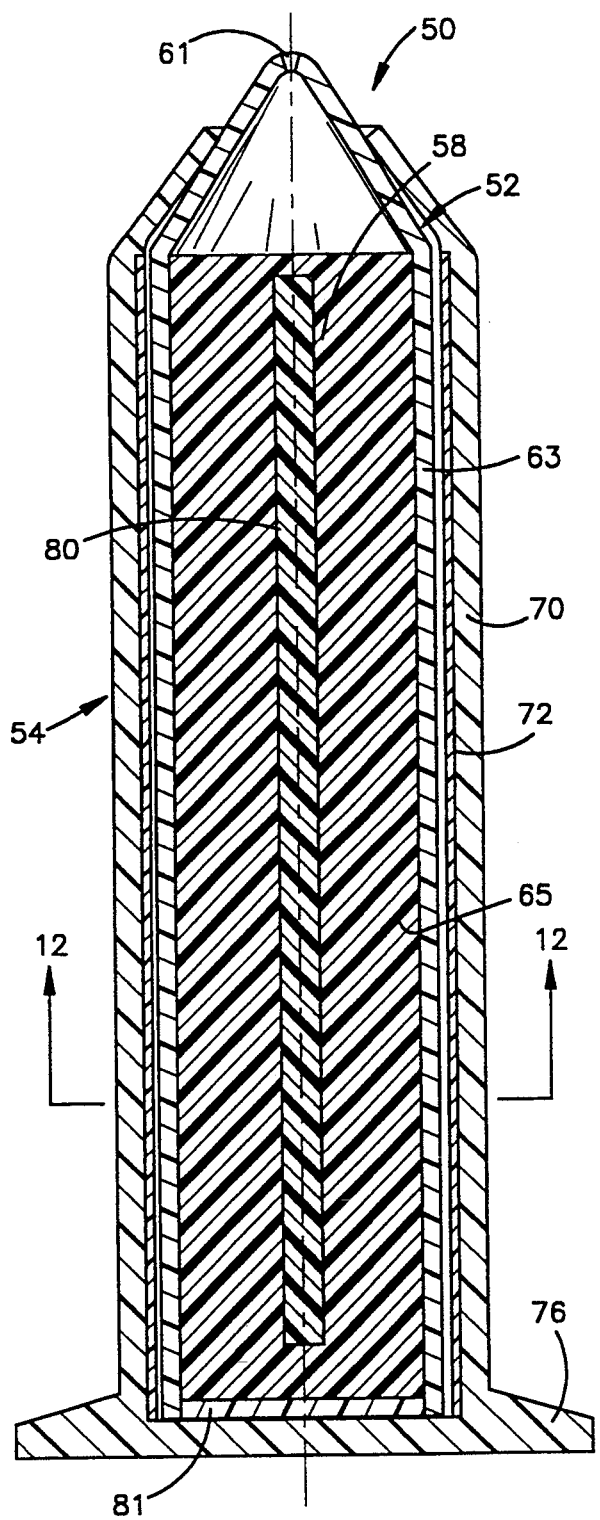
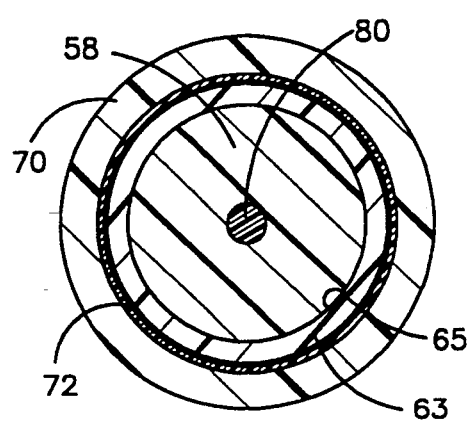
Fig.11
Fig.12

MICROWAVEABLE HOT MELT DISPENSER

This is a continuation of copending application Ser. No. 08/020,511, filed on Feb. 22, 1993, now abandoned with is a continuation-in-part of Ser. No. 562,518 filed Aug. 6, 1990, now U.S. Pat. No. 5,188,256.

TECHNICAL FIELD

The present application is a continuation in part application of copending U.S. Ser. No. 07/562,518 filed Aug. 6, 1990, for "Method of Heating and Dispensing Hot Melt Materials that Employs Microwaveable Energy (As Amended)" Nottingham, et al. now U.S. Pat. No. 5,188,256. The present application is also a companion application to the application of Nottingham, et al., entitled "Dispensing Apparatus and Method for Hot Melt Materials that Employs Microwave Energy," U.S. Ser. No. 08/020,662, filed Feb. 22, 1993, and now abandoned. Generally, the present invention relates to improvements in the design and construction of apparatus for dispensing microwaveable hot melt adhesives and other heat sensitive materials. The apparatus comprises a dispenser which is heated by microwaves and then used to dispense a material therefrom. The dispenser is specifically designed to convert microwave energy into heat and to transfer the heat to the material to be dispensed in a more efficient and/or safe manner. The dispenser is particularly useful for heating and dispensing a material (e.g., a hot melt adhesive) which is capable of changing from a solid state or a state of high viscosity to a state of low viscosity when heated above a predetermined threshold temperature, thereby enabling the material to be dispensed when in the state of low viscosity.

BACKGROUND OF THE INVENTION

Conventionally, hot melt adhesive was applied using hot melt adhesive applicators (glue guns). These glue guns were designed to be connected to a wall socket by an electrical cord and plug for continuously applying electrical power to the glue gun, thereby melting the adhesive In the glue gun. This meant that the range over which the glue gun could physically operate was determined by the length of the electrical cord coupling the glue gun to the wall socket. Moreover, the cord at times presented a physical obstacle for the user to maneuver around when using the glue gun.

To solve these problems, a cordless glue gun was designed. A cordless glue gun is a glue gun that can be detached from its source of electricity so that it can operate without an electrical cord. In designing a cordless glue gun, significant attention needs to be paid to the support structure for the gun. The support structure must conveniently support the glue gun and enable the glue gun to be electrically energized (heated) while It is on the support structure. Moreover, the support structure and the glue gun need to be designed to enable convenient release of the glue gun from the support structure and from the source of electricity when it is desired to use the glue gun. Toward these purposes, the support structure includes a socket for transmitting electrical energy to the glue gun and a release mechanism enabling the glue gun to be disconnected from the socket when it is released from the support structure.

Despite the improvements that a cordless glue gun offers over a conventional glue gun, a cordless glue gun still has drawbacks. Although the cordless glue gun does not require continuous electrical power, It must be initially electrically heated while on the support structure and may require intermittent electrical heating to maintain the hot melt adhesive in a state of low viscosity. Additionally, both the conventional glue gun and the cordless glue gun require hot melt adhesive sticks or other forms of bulk adhesive to be inserted into the glue gun. This requires the purchase of the hot melt adhesive separate from the purchase of the glue gun itself and the handling of the hot melt adhesive before each use of the glue gun. Moreover, both the conventional glue gun and the cordless glue gun are bulky, relatively expensive to purchase, need a relatively long preheating time before glue can be dispensed, and a relatively long cool down period before being stored away.

A marked improvement and innovation in the dispensing of heat sensitive materials, specifically hot melt adhesives, was made by Nottingham et al. in the aforementioned U.S. patent (U.S. Pat. No. 5,188,256), the contents of which are incorporated herein by reference, of which the present application is a continuation-in-part. Specifically, Nottingham et al. disclose a dispenser for heat sensitive materials comprising a first material which changes from a solid state or a state of high viscosity to a state of low viscosity when heated above a predetermined temperature, a second material which is adapted to be heated above a predetermined temperature when subjected to microwave energy for at least a predetermined time, a container enclosing the first and second materials, and an outlet through which the first material can be dispensed from the container when in the state of low viscosity. In the specific embodiment described therein, a hot melt adhesive is encased within a container, the inner surface of which has been coated with a microwave susceptor material.

BRIEF DESCRIPTION OF THE DRAWINGS

FIG. 1 is a schematic illustration of a dispenser and a cover therefor, constructed according to the principles of this invention.

FIG. 2 is a cross-sectional view of the dispenser and cover of FIG. 1, perpendicular to the planar axis of the cover.

FIG. 3 is a cross-sectional view of the dispenser and cover therefor, similar to that in FIG. 2, with the addition of a third material between the first material and the second material in the dispenser.

FIG. 4 is a cross-sectional view of the dispenser of FIG. 2, taken along line 4—4.

FIG. 11 is a cross-sectional side view of a dispenser and cover similar to that shown in FIG. 8, but showing a heating stick located within the dispenser.

FIG. 12 is a cross-sectional top view of the dispenser of FIG. 11 taken along line 12—12.

SUMMARY OF THE INVENTION

Figures 5, 6:
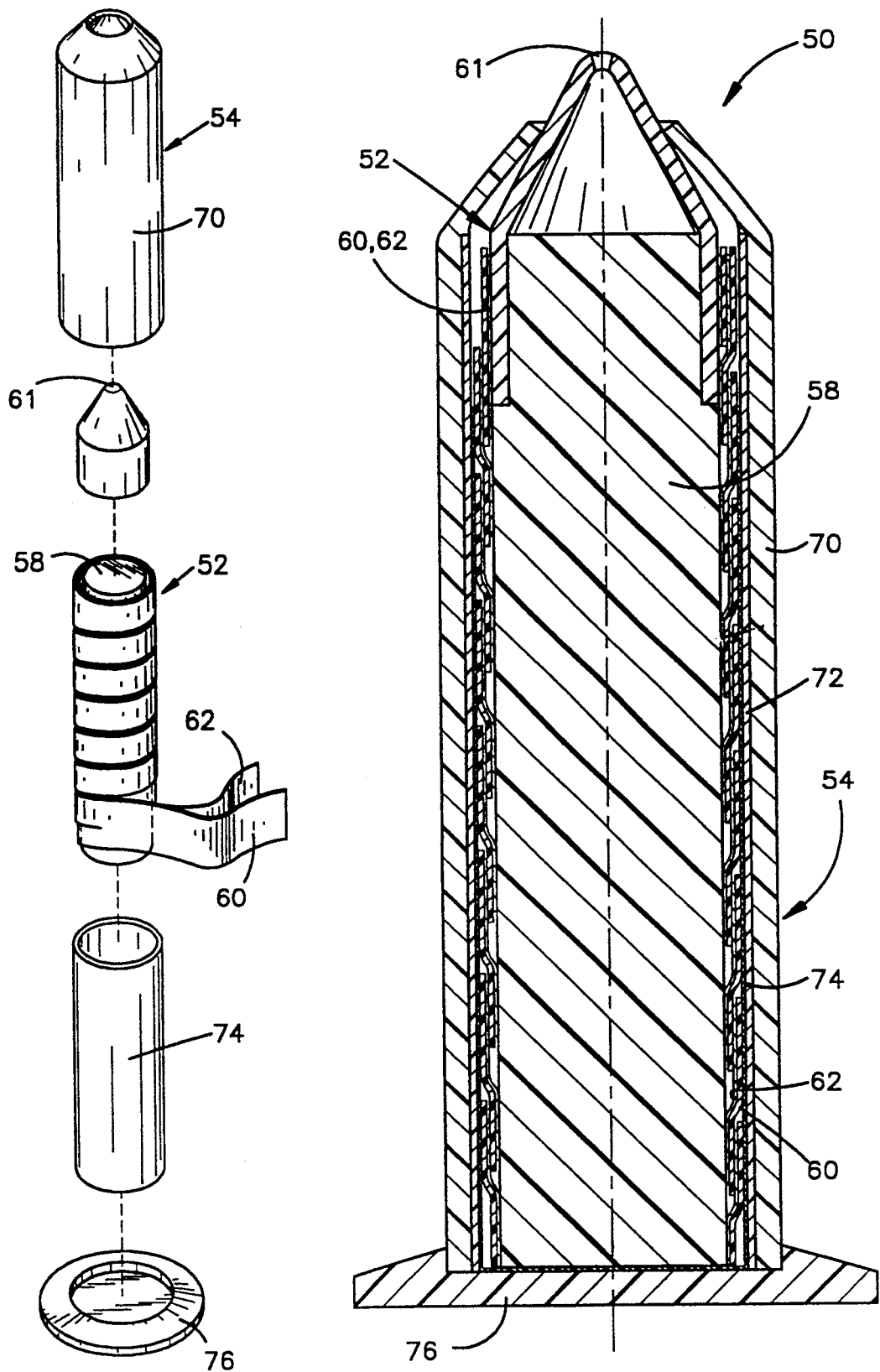
FIG. 5 is a partially assembled schematic illustration of a dispenser and a cover therefor, constructed according to an additional embodiment of the present invention.
FIG. 6 is a cross-sectional side view of the dispenser and cover of FIG. 5, with the dispenser and cover fully assembled.

The present invention is directed to novel improvements and refinements of the aforementioned Nottingham et al. hot melt adhesive dispenser. In particular, the present invention is directed to modifications and refinements in a microwaveable hot melt adhesive dispenser which provides for more efficient and, from a consumer standpoint, safer use. In general, the dispensing apparatus of the present invention is designed to be compact and portable for ease of use. In this respect, it is generally a hand holdable dispenser. Of course, however, larger embodiments are also contemplated for potential use in industrial settings.

The dispenser concept of the present invention is particularly useful for transforming materials, particularly hot melt materials, from a solid state or state of high viscosity to a liquid state or state of low viscosity when heated above a predetermined threshold temperature. Hot melt materials that may be employed in the practice of the present invention include, for example, hot melt adhesives, food products (i.e., hard candy, chocolate, etc.), solder, wax, and oil. The present invention may also be used for the dispensing and initiation of reaction of heat sensitive reactive materials. Specifically, such heat sensitive materials include materials which cure or polymerize upon exposure to a predetermined temperature for a set period of time. Such heat sensitive materials include, for example, thermosetting resins selected from the group consisting of epoxies, polyesters, polyurethanes, polybutadienes, cyanate esters, bismaleimides, polyimides, phenolics, alkyds, amino resins and silicones. The invention is especially beneficially used for the dispensing of hot melt adhesives and will, for the most part, be discussed in this context.

In accordance with one embodiment of the present invention, the dispenser includes a first material to be dispensed, a second material in a heat transfer relationship with the first material, but not dispersed within said first material, a container within which the first material is disposed and which may either comprise or contain the second material as well, and an outlet through which the first material is to be dispensed following exposure of the apparatus to microwave energy; wherein the second material is a ferromagnetic material selected for particular dielectric and magnetic properties. Since a ferromagnetic material can heat through two mechanisms, i.e., resistive heating and magnetic heating, each mechanism must be considered. In the case where resistive heating is minimal, the maximum temperature of the system can be controlled via the choice of material in regard to the Curie temperature, i.e., the temperature at which the material becomes microwave transparent. Once this temperature is reached, the material no longer heats with exposure to microwave radiation. The rate at which the Curie temperature is approached is a function of the saturation magnetization of the material. Here, for optimal efficiency, the saturation magnetization should be maximized. For the case where the effects of resistive heating cannot be removed from the equation, the Curie temperature no longer limits the upper temperature of the system when exposed to microwave radiation. Here, both heating mechanisms are in effect and must be considered. The extent of resistive heating is a function of material concentration as well as the strength of the microwave energy source. Control of resistive heating requires a change of the dielectric parameters of the material as a function of temperature. This temperature should coincide with the optimal heating temperature of the system and perhaps the Curie temperature. Thus, by utilizing the dielectric and magnetic properties of the ferromagnetic material, the optimal heating profile can be designed for any given first material to accommodate the appropriate change of viscosity or initiation of reactivity without introducing degradation or ignition problems. Preferred ferromagnetic materials include the ferrites and spinels. Especially preferred ferromagnetic materials are ferrites which exhibit the inverse spinel crystallographic structure, i.e., spinel ferrites. Especially preferred ferromagnetic materials are those which have predominantly magnetic heating characteristics, most preferably those having substantially no electric or resistive heating characteristics.

A second embodiment of the present invention relates to a similar overall apparatus wherein the container, or at least the inner surface of the container, comprises the second material, regardless of the compositional makeup of the second material. In particular, this embodiment contemplates a molded elongated container having a longitudinal axis, the container having at least one rib on its interior surface parallel to and extending inwardly towards the longitudinal axis. In one embodiment, the container may be molded of a high temperature polymeric material upon which is deposited the second material, either in particulate form or as a film. Alternatively, the container itself may comprise the second material wherein the container is molded from a high temperature polymeric material having dispersed therein a particulate material which is, itself, designed to heat when subjected to microwave energy. In this alternative embodiment, the polymeric material must be selected such that it has sufficient heat transfer characteristics so as to transfer the heat generated by the dispersed particle to the first material contained within the container. The preferred iteration of this embodiment comprises two ribs on opposing interior surfaces of the container. The presence of the ribs extending from the interior surface of the container into the first material accelerates and aids in the heating of the first material.

Another embodiment in accordance with the practice of the present invention employs a heating rod having a longitudinal axis parallel to the longitudinal axis of the container as the second material. This heating rod may be encased or embedded within the first material. Preferably, the heating rod is of sufficient length and shape so as to provide ample surface area for contact with the first material. Generally, the heating rod will extend for almost the full length of the longitudinal axis of the container. Alternatively, the heating rod will extend through at least substantially all of the first material. This embodiment is especially efficient inasmuch as all of the radiant energy from the heating rod is transferred to the first material. Furthermore, this allows the first material to be heated from the inside out such that heating of the exterior container surface is minimized. Of course, the heating rod could also be used in conjunction with a container which is or whose inner surface is comprised of the second material as well. Such an embodiment would provide for very fast heating of the first material inasmuch as heating would occur from both directions in the first material.

Finally, a fourth embodiment in accordance with the practice of the present invention incorporates the use of an insulative jacket which substantially encases or encloses a dispenser, the dispenser comprising a first material which, upon heating to a predetermined temperature, is either transformed from a solid state or state of high viscosity to a liquid state or a state of low viscosity or activated such that polymerization or cure of the first material is initiated, a second material which is designed to heat to at least the predetermined temperature when subjected to microwave energy for at least a predetermined period of time, the second material also being in a heat transfer relationship with the first material, a container within which the first material is disposed and which may either comprise or contain the second material, and an outlet through which the first material is to be dispensed following exposure of the apparatus to microwaves. The insulative jacket may comprise a part of the container or it may comprise a reusable sleeve into which the container is inserted and withdrawn. In the former embodiment, once all the material in the container is dispensed, the whole of the apparatus comprising the dispenser and the jacket are discarded. In the latter embodiment, once all the material is dispensed from the dispenser, the dispenser is withdrawn from the sleeve and a new dispenser inserted so as to make the sleeve reusable.

In accordance with this embodiment of the invention, it is preferred that insulative jacket comprise at least one layer of an insulating material, preferably at least one layer of a polymeric foam. Alternative embodiments may comprise multiple layers including an exterior layer, one of which, but preferably not the exterior layer, is comprised of a fiberglass mat.

The use of the insulative jacket provides for a substantially cool to the touch exterior surface which is to be handled by the consumer while allowing for sufficient heating of the first material to transform itself from its solid state or state of high viscosity to its liquid state or state of low viscosity or to achieve that temperature at which polymerization or cure is initiated.

Other features and advantages of the present invention will become apparent from the following detailed description and accompanying drawings which form a part of the specification.

DETAILED DESCRIPTION OF THE PREFERRED EMBODIMENTS

Generally, the present invention relates, in its broadest concept, to improvements and variations in an apparatus for dispensing a heat sensitive material wherein the apparatus comprises:
(i) a first material, which upon heating to a predetermined temperature, is either transformed from a solid state or state of high viscosity to a liquid state or state of low viscosity or activated such that polymerization or cure of the first material is initiated;
(ii) a second material which is designed to heat to at least the predetermined temperature when subjected to microwave energy for at least a predetermined period of time, said second material also being in a heat transfer relationship with the first material;
(iii) a container within which the first material is disposed and which may either comprise or contain the second material; and
(iv) an outlet through which the first material is to be dispensed following exposure of the apparatus to microwaves.

When used herein, reference to the first material, second material and container shall, unless otherwise specifically stated, refer to this general construction.

The first material which may be employed in the practice of the present invention may comprise any number of materials which are heat sensitive in that they transform from a solid state or state of high viscosity to a liquid state or state of low viscosity upon being heated to a predetermined temperature or which are activated such that polymerization or cure of the first material is initiated upon heating to a predetermined temperature. Materials meeting the former characteristics are oftentimes characterized as being hot melts. Exemplary of such materials there may be given hot melt adhesives; food products such as hard candy, chocolate, syrups, jams, and the like; solder; wax; and oil. First materials which are contemplated by the latter characterization include thermosetting resins such as epoxies, polyesters, polyurethanes, polybutadienes, cyanate esters, bismaleimides, polyimides, phenolics, alkyds, amino resins and silicone, as well as other heat curable or heat polymerizable materials. When these latter materials are to be dispensed, it is especially preferred to regulate the cure or polymerization rate so as to provide for sufficient time in which to heat the material and dispense the material for its intended use prior to substantial cure or polymerization.

The present invention is especially suited for use in the heating and dispensing of hot melt adhesives. In this light, and for ease and simplicity of discussion, the apparatus and methodology of the present invention will be discussed with respect to hot melt adhesives in particular.

A hot melt adhesive suitable for these purposes is manufactured and sold by the H. B. Fuller Company under the designation. Product No. 2125. Of course, other hot melt adhesives may also be used in the practice of the present invention including those based upon or comprising polyvinyl formal, polyvinyl butyral, ethylene vinyl acetate (EVA), polyethylene (PE), polypropylene (PP), polyamide, polyester, polyesteramide, and copolymers and blends of the foregoing.

The second material, which is in a heat transfer relationship with the first material, is adapted to be heated above a predetermined temperature when subjected to microwave energy for at least a predetermined period of time. Typically, these materials are Known as susceptors and are comprised of microwave absorbing particles. Exemplary of susceptors which may be used in the practice of the present invention are those known for use in microwave cooking. In its simplest embodiment, the susceptors comprise microwave-absorbing materials which may be in particulate, atomized or film form, depending upon the particular embodiment or methodology of construction of the apparatus of the present invention. The susceptor materials themselves generally comprise metals such as iron, aluminum, and stainless steel; metal oxides such as ferrites, especially ferrites exhibiting inverse spinel crystallographic structure, and spinels; ceramics; and carbon particles such as graphites, carbon blacks, and carbon fibers. Obviously, those skilled in the art will also readily recognize other susceptor materials which may be used in the practice of the present invention as well.

In one particular-embodiment of the susceptor, particulate microwave absorbing materials are adhered to or embedded in a high temperature polymeric film substrate. The film being used as a layer in the construction of the apparatus. Alternatively, particles of the microwave absorbing material may be dispersed within a high temperature resistant polymer matrix which may then be coated upon the inner surface of the container or which may comprise one or more layers of the container. Further, as will be discussed below, the second material may also comprise, be adhered to, or be dispersed within a structure, such as a heating rod, compressible coil, or foam particles, which is, in turn, disposed within at least a substantial portion of the first material.

As mentioned, one type of susceptor basically comprises microwave energy absorbing particles adhered to a high temperature polymeric film. Susceptors of this type are normally classified by their optical density. Such susceptors suitable for use in accordance with the practice of the present invention generally have an optical density in the range of 0.05 to 2.0. Such films having optical densities in the high end of this range or higher generally have greater reflective characteristics and less absorptive characteristics such that generation of heat by the susceptor is very slow and, at extremely high optical densities, is impractical for use in the practice of the present invention. Preferably, such film susceptors have optical densities of from 0.10 to 0.35. One commercially available susceptor of this type comprises metal particles disposed upon a high temperature polyimide film. Such materials are manufactured and sold by National Metalizing Company of Cranbury, N.J. The underlying polyimide film or substrate is manufactured and sold by E. I. DuPont De Nemours & Company under the trademark "Kaptan." Other high temperature polyimide films which may be used in the manufacture of such susceptor films include the polyether imides manufactured and sold by General Electric Company of Pittsfield, Mass., under the trademark "Ultem."

Other high temperature films may also be used as the substrate for the microwave absorbing particles including various thermoplastic polymers, synthetic resins and the like, including, for example, polyester films. These films, as well, are readily commercially available from a variety of suppliers including the aforementioned National Metalizing Company. The susceptor films may be used alone or in conjunction with a second, typically supporting, film. In this latter aspect, the susceptor film comprises a part of a film composite wherein the polymeric film, having deposited thereon the microwave absorbing particles, is adhered to a higher temperature resistant or more structurally oriented support polymeric film. The supporting film may comprise, for example, polyimide films of the type previously mentioned, as well as other high temperature materials. The susceptor film is adhered to the supporting film by use of high temperature adhesives, for example Avery 1184, manufactured and sold by Avery Products Corporation of San Marino, Calif. In any case, the backing or support layer provides a stable, high temperature backing for the outer susceptor film. One particular embodiment of this composite comprises a susceptor film, which is a polyester film having deposited thereon microwave absorbing particles, bonded to a microwave transparent polyimide film using a high temperature adhesive. This embodiment will be discussed further in relation to the figures.

Another embodiment in which the susceptor is found is one in which the microwave absorbing particles are dispersed in a high temperature thermoplastic matrix. Suitable thermoplastic matrices include the aforementioned polyesters, polyimides, silicones, and the like. Exemplary of such microwave absorbing particle-filled susceptor materials include carbon black filled silicone resins, ferrite-filled silicone resins, and the like. Generally, the amount of particulate microwave absorbing material incorporated into the polymer matrix is that which is sufficient to provide sufficient heat to the first material in a reasonable period of time. Preferably, the amount of material to be incorporated into the polymer matrix resin may comprise anywhere from between 5 and 50%, preferably between 10 and 40%, by weight, based on the combined weight of the microwave absorbing material and the polymer matrix resin. While lower levels of incorporation could be used, such lower levels will result in poor heating or too slow a heating time as to be commercially viable. Concurrently, higher loadings of the microwave absorbing material may be employed, although such high loading may adversely affect the physical characteristics of the polymer matrix resin and may also cause too rapid a rate of heating or enable excessive temperatures to be achieved.

An especially preferred microwave absorbing material to be employed as the susceptor are ferromagnetic materials which have selected dielectric and magnetic properties such that the minimum temperature attained with exposure to microwave radiation for some nominal time is at least equal to the predetermined temperature at which the first material is either transformed from its solid state or state of high viscosity to its liquid state of state of low viscosity and reaches a maximum temperature in a predetermined amount of time which is lower than the temperature at which the first material will boil or be adversely affected by the heat generated by the second material and lower than the ignition temperature of any of the materials used in the construction of the apparatus. Preferred ferromagnetic materials are those which have predominantly magnetic heating characteristics. Especially preferred are those which have substantially no electric or resistive heating characteristics, most preferably those which are essentially free of resistive heating characteristics. In this latter respect, the material will heat at a rate determined by the saturation magnetization until the Curie temperature is reached, at which time the material becomes microwave transmissive and heating stops. Conversely, if resistive heating is contributing to the overall temperature of the system, heating may continue above the Curie temperature and runaway status may result in ignition of the apparatus. A semi-quantitative assessment of the level of resistive heating characteristics of such ferromagnetic materials may be ascertained from the electrical interaction or impedance of the ferromagnetic material at the frequency of the microwave energy to be used.

When high frequency energy couples with the ferrite, an impedance is developed which has an inductive and resistive component. Of concern here is the frequency at which a given ferrite displays a reduction in permeability. At this frequency, the inductive reactance falls and the lossy characteristics dominate, thus, the resistive component of the ferrite assumes the role of essentially dissipating the unwanted energy, i.e., in the form of heat. Generally, the higher the impedance, the more preferred the material for the application discussed herein.

The use of such ferromagnetic materials is especially desirable in applications where the materials used in the construction of the dispensing apparatus, particularly in the container and the insulative jacket, as discussed below, have ignition points not substantially or markedly higher than the Curie temperature. It is also desired to use such ferromagnetic materials where the first material is adversely affected by higher temperatures or is subject to boiling at such higher temperatures. Where a hot melt material is to be employed as the first material, it is only desirable to heat the hot melt to a temperature at which the liquid state or state of low viscosity is achieved. Concurrently, where a heat reactive material is the first material, it is similarly desired to avoid heating the first material to a temperature substantially above the reaction temperature.

Of course, it is recognized that other materials may be added to the susceptor including, for example, blocking agents such as calcium salts, zinc salts, zinc oxide, etc., which have demonstrated effectiveness at regulating the heat generated by the susceptor material itself. For example, the susceptor material comprising carbon black dispersed in a silicone matrix will continue to heat as long as it is subject to microwave energy. Absent removal of the apparatus from microwave energy, the apparatus may heat to a point where it either ignites itself or ignites the microwave assembly. The use of such blocking agents with the carbon black will assist in lessening the likelihood that excessively high temperatures will be attained. It should be noted, however, that many of these blocking agents work by acting as heat or energy absorbers. For example, the dissociation energy of a hydrated blocking agent may be attained when some elevated temperature is reached. Thus, at this temperature, the blocking agent will absorb any additional energy for the dissociation reaction. This reaction will continue until all water molecules are dissociated; then heating of the material will resume. As such, the overheating of the overall system has not been prevented, merely postponed for some amount of time which may or may not be sufficient in the current application.

The first material is disposed within a container which may comprise the second material or in which the second material as well may be disposed. Generally, the container provides the structural definition and integrity to the dispensing apparatus of the present invention. The container itself may comprise one or more layers of materials, depending upon the desired construction and materials to be dispensed. Additionally, it is contemplated that the second material may be coated on the interior surface of the container, may comprise an interlayer which is sandwiched between two non-susceptor layers, all of which comprises the container, or it may comprise the second material altogether.

Materials suitable for use in manufacturing the container depend upon the particular construction and embodiment in which the apparatus of the present invention is to exist. For example, where the second material is coated upon the inner surface of the container or is contained within the container, then the container comprises at least one high temperature resistant material immediately adjacent the second material or, where the second material is contained within the first material, on the inner surface of the container itself. Such high temperature resistant materials must be microwave transparent so as to enable the microwave energy to reach the second material. Where the container comprises multiple layers, including an interlayer comprising the second material, then the outer layer immediately adjacent the second material must be a microwave transparent, high temperature resistant material and is preferably nonheat transmissive. Concurrently, the inner layer, i.e., that layer between the second material and the first material, must be a high temperature resistant, heat transmissive material so as to enable transfer of the heat from the second material to the first material and is preferably microwave transparent so that there is no impediment to the movement of microwaves through the dispensing apparatus. Finally, where the second material comprises the container, then the container must be manufactured from a high temperature resistant, microwave transparent, heat transmissive material.

Exemplary of the materials that may be used in the manufacture of the container include polyimides, high-temperature polyesters, modified polyphenylene oxide resins, silicones and other thermoplastic polymers having the desired aforementioned characteristics. Selection of a particular material for use in manufacturing the container will depend, in part, upon the temperature needed to effect the transformation and/or cure of the first material, as well as the likely temperatures to be attained by the second material during the period of time in which the apparatus is to be or is likely to be subject to microwave energies. Thus, for example, where the first material is a low temperature melting hot melt adhesive, melting point of about 100° C., and the design or configuration of the container is such that it is anticipated that the maximum heating time to be recommended would not exceed three minutes such that the temperature to be attained by the second material is not likely to exceed 150° C., then a suitable high-temperature material for use in the manufacture of the container may be one which has a melting point of 180° C. Concurrently, should a high temperature hot melt (one having a melt temperature of 250° C.) be employed, then a correspondingly higher temperature attaining second material will be used in conjunction with an even higher temperature resistant polymer for the container. In essence, selection of the material is dependent upon the proximity of the second material to the container and the maximum temperatures which this second material is likely to attain when subjected to microwave energies for a period of time in excess of that which is recommended. This latter stipulation will allow for those instances where the consumer is likely to leave the apparatus in a microwave oven longer than the time specified on any directions and will compensate for excessive heating even when the recommended heating period is followed as may be caused by hot spots in the microwave oven.

Finally, the outlet through which the first material is to be dispensed is preferably in the form of a nozzle. However, depending upon the particular form of the dispenser as a whole, other forms of outlets may also be suitable. Preferably, the second material is also found in the nozzle or outlet. In this instance, the nozzle, which may be unitary with the container or an independent component attached to the container, may comprise a polymeric material in which the susceptor material is dispersed. Alternatively, the nozzle may be coated with the susceptor material or with a film susceptor. The purpose of incorporating the susceptor into the nozzle is to prevent heat loss in the first material as it is being dispensed through the nozzle. Otherwise, such heat loss may result in the solidification and blockage of the outlet.

In use, the dispensing apparatus as described above, is placed in the microwave oven or subject to a source of microwave energy for a sufficient, predetermined period of time, given the frequency of the microwave energy, to effect the transformation of the first material from a solid state or state of high viscosity to a liquid state or a state of low viscosity or to activate the reactive constituents comprising the first material so as to initiate polymerization or cure thereof. This dispensing apparatus is suitable for use in conventional home microwave ovens having a wattage of from 400 watts to 800 watts, and higher, and a frequency of approximately 2.5 GHz. Of course, the dispenser could also be used in commercial or industrial-style microwave ovens which typically have wattage in excess of 900 watts and a frequency of from about 10 KHz, to 100 GHz, with the same results but in less time. Once the dispensing apparatus has been heated for a sufficient time, the dispenser is then removed from the oven and materials dispensed therefrom onto the desired place of application. Dispensing is usually effected by squeezing or compressing the container so as to force the first material out through the outlet. In this respect, it is generally preferable to select low or medium modulus materials, i.e., readily compressible materials, for use in the construction of the apparatus. Concurrently, although not specifically required, such materials are of a resilient nature in that once the compressing forces are removed from the surface of the container, the container returns to its original or substantially original configuration and shape. Such a resiliency characteristic will enable the first material in the nozzle portion to be sucked back into the main body of the container.

In its most preferred embodiment, the dispensing apparatus of the present invention also comprises an insulative jacket substantially encasing the dispensing apparatus as described above. This insulative jacket is microwave transparent and comprises at least one layer of an insulating material. Especially preferred are insulative jackets comprising two or more layers, at least one of which is an insulating material. In one embodiment the insulative jacket may comprise one or more layers having insulating characteristics and an exterior layer having non-insulating properties. In this respect, the outer layer may be composed of any suitable polymeric material, paper or paper board, and the like, upon which the desired labeling, package coloration, and the like, may be affixed or printed. Suitable insulating layers comprise, for example, a foamed or expanded polymeric material such as polyethylene foam, polypropylene foam, modified polyphenylene oxide foam, polystyrene foam, and so forth. Other suitable insulating materials include, for example, fiberglass, fiberglass mat, injection molded high-temperature fiberglass filled plastic, low heat transmissive silicones, and the like. Where the heat insulative jacket comprises multiple layers, it is contemplated, and preferred, that the jacket include at least one intermediate insulating layer formed from a material such as non-woven fiberglass, fiberglass mat, or a foamed polymer. In general, it is preferred that the insulative layer be manufactured from flexible, resilient materials capable of withstanding high temperatures, for example approximately 500° F., for that period of time for which the dispensing apparatus is contemplated to be heated in the microwave oven.

The purpose and benefit of the use of the insulative jacket is two-fold. First, the insulative jacket provides a cool-to-the-touch surface so that the consumer can readily remove the dispensing apparatus from the microwave oven by hand without concern for burning one's hand. Additionally, because the insulative jacket is essentially heat non-transmissive, the insulative jacket serves to retain the heat generated by the second material within the container and, thus, the first material. Consequently, the use of such insulative sleeves provides for much longer use times following removal of the dispensing apparatus from the microwave energy source. In one embodiment, it is preferred that the insulative jacket encase all of the dispensing apparatus but for the extreme tip of the outlet or dispensing nozzle. This will also serve to retain heat within the nozzle portion as well.

In one embodiment of this aspect of the present invention, the insulative jacket may be adhered to or comprise the outer layers of the container for the dispenser. In this aspect, once the first material has been fully dispensed, the whole of the dispensing apparatus is discarded. In another (and preferred) embodiment, the insulative jacket comprises a sleeve into which the dispensing apparatus as described above is inserted for use and withdrawn and discarded after the first material has been fully dispensed. This embodiment allows for the reusability of the sleeve, minimizing costs and waste of raw materials.

Regardless of which embodiment is employed, it is imperative that the insulative jacket be microwave transparent and constructed of sufficiently flexible and resilient materials as not to interfere with the dispensing of the first material following exposure of the dispensing apparatus to microwave energy.

To aid in the full understanding of the scope and nature of the present invention, Applicants will now describe various specific embodiments of the apparatus of the present invention with reference to the attached figures.

FIG. 1 illustrates a perspective view of a dispensing unit 10 in accordance with one embodiment of the practice of the present invention. The dispensing unit 10 includes a dispenser 12 and a cover 14 therefor. The cover 14 serves as both a cool-to-the-touch dispensing aid as well as a stand for the dispenser and comprises a pair of side members 30 and 32 and a central member 34 therebetween. The side members 30 and 32 and the central member 34 are integrally formed and have an integrally formed hinge structure 36 between each side member and the central member. Preferably, the cover 14 comprises an opening 38 extending through the central member 34, each hinge structure 36, and through the top portion of each of the side members 30 and 32. The opening 38 is dimensioned to allow the nozzle 24 of the dispenser 12 to fit therethrough.

The cover 14 is preferably formed from a relatively rigid, heat insulating composite material. Exemplary of an appropriate material for a cover is a composite formed by laminating 1/16 to 3/32 of an inch of polypropylene foam and/or polyethylene foam to a bleached hardwood craft paper having a thickness of 0.01 to 0.02 inches. Generally, the cover enables the dispenser to be maintained in an upright orientation when the cover is supported on a surface in an inverted "V" shaped position. The hinge structure 36 enables the side members 30 and 32 to be subject to opposing forces, and, thus squeezed, compressing the dispenser 12 so as to dispense the first material contained within the dispenser through outlet 24.

FIGS. 2 and 3 provide cross-sectional views of two alternative embodiments of the dispenser wherein the first material 18, the material to be dispensed, is contained within the container 22 whose inner surface is coated with a layer of the second material 20. The second material 20 comprises a susceptor film comprising, for example, a high temperature polyimide film having deposed thereon metal particles. It is generally preferable to maintain an air space 25 above the first material 18 so as to allow for expansion of the first material upon heating. This is particularly important in the event the dispensing unit is subjected to microwave energy for too long a period of time and the first material begins to boil.

FIG. 3 illustrates a similar embodiment wherein the container 22 is formed of a multilayer composite comprising an exterior layer 23, an intermediate second material layer 20, and an interior layer 40. In this instance, the second material or susceptor film is sandwiched between the exterior layer 23 which is microwave transparent and an interior layer 40 which is heat transmissive and preferably microwave transparent. As with the embodiment shown in FIG. 2, the second material may comprise a polyimide film having deposited thereon metal particles. The exterior layer 23 and interior layer 40 may be composed of the same material, for example, high-temperature thermoplastics such as polyimides, polyesters, silicones, and the like. Multilayer configurations are particularly desirable where the first material 18 is a food product which, for health reasons, may not come in contact with material contained within the susceptor layer 20 or the exterior layer 23. Similarly, the use of the inner layer 40 may also be important where the first material 18 is a reactive material which is adversely affected by constituents contained within the susceptor layer 20 or the exterior layer 23.

FIG. 4 illustrates a cross-section of the dispenser 12 shown in FIG. 2 taken along the line 4—4. Again, this embodiment shows the container 22 encasing both the susceptor layer 20 and the first material 18.

FIGS. 5 and 6 illustrate a further embodiment of a dispensing unit 50 constructed in accordance with the practice of the present invention. The dispensing unit 50 includes a dispenser 52 and an insulative jacket 54 therefor. The dispenser 52 includes a first material 58 to be dispensed, a second material 60 in a heat transfer relationship with the first material 58, and an outlet 61 through which the first material 58 can be dispensed. The second material 60 comprises a susceptor which is adapted to be heated above a predetermined temperature when subjected to microwaves for at least a predetermined period of time. The susceptor comprises microwave absorbing particles deposited on a thin (48 gauge) microwave transparent polymeric film, for example polyester film. In one embodiment, the susceptor 60 is adhered, using a high temperature adhesive (e.g., Avery 1184), to a second microwave transparent inner sheet 62 of, for example, polyimide film. This inner sheet 62 provides a stable, high temperature backing for the outer susceptor film 60. The composite film comprising the susceptor 60 and the inner microwave transparent sheet 62 is then spirally wound together around the first material 58 to form a container, for example a tube, with the susceptor 60 located on the outer surface of the tube. In this embodiment, it is generally preferred to have the upper edge of the composite film overlap and be adhered to the lower edge of the preceeding winding of the composite film. This aspect is shown particularly well in FIG. 7.

In an alternative iteration of this embodiment, the inner microwave transparent sheet 62 can be first spirally wound around the first material 58 and then the susceptor 60 can be wound or folded, widthwise, around the entire length of the inner microwave transparent sheet to form a container. In this case, the susceptor does not overlap along the edges and thus the formation of "hot spots" are prevented from occurring along the length of the dispenser. Still further, the susceptor particles can be deposited directly onto the outer surface of the outer microwave transparent sheet 62 and this single sheet can then be spirally wound into a tube around the first material 58 to form a container. In any event, where the composite film is constructed, a high temperature adhesive is applied to bond the susceptor film 60 to the inner microwave transparent sheet 62. Furthermore, where there is overlap of the composite structure in the construction of the container, this high temperature adhesive is also applied between such overlapping edges to adhesively secure the sheets together.

Figure 7:
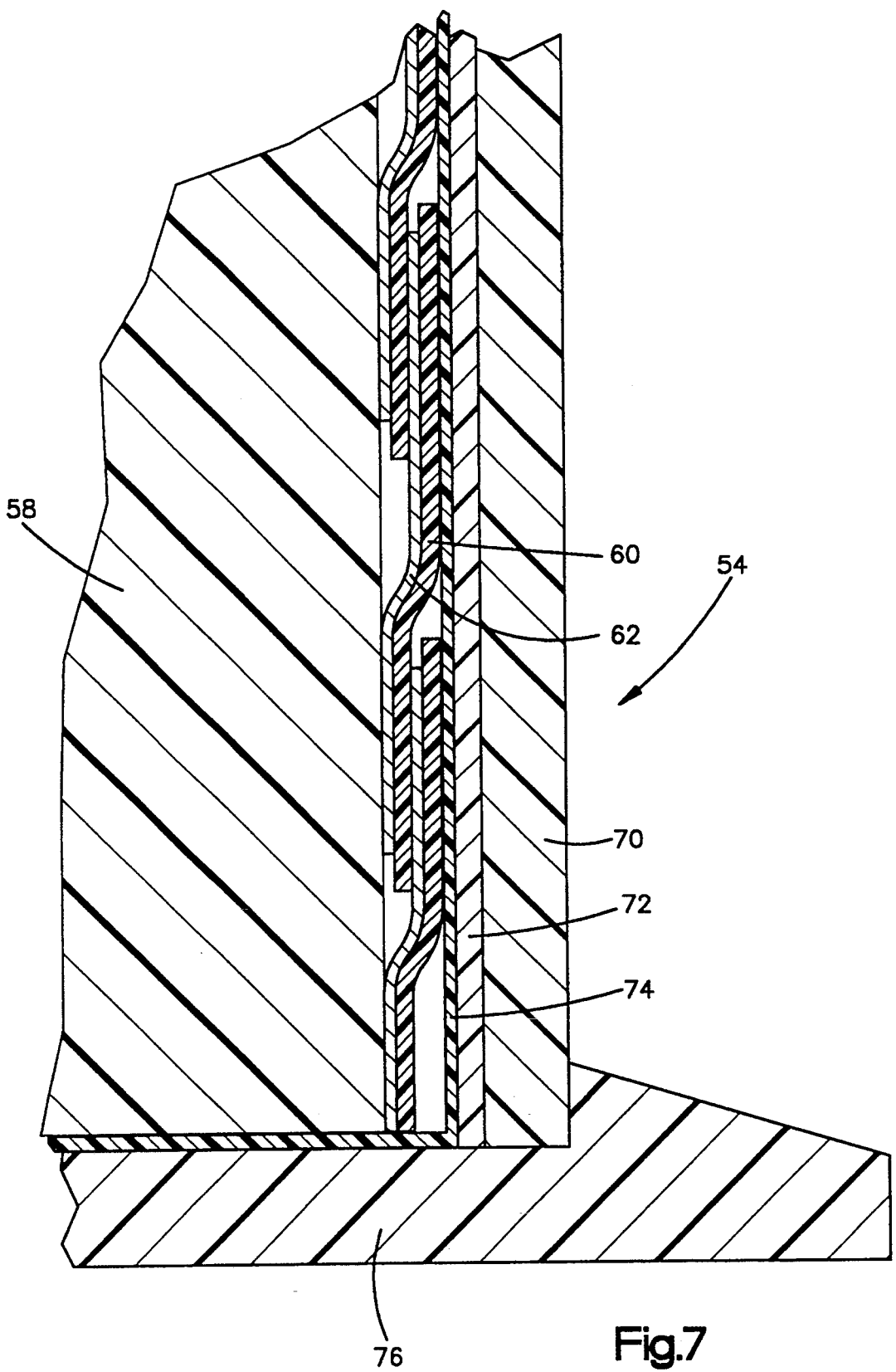
FIG. 7 is an enlarged partial cross-sectional side view of the dispenser and cover of FIG. 6.

As shown in FIGS. 5 through 7, the so formed dispenser 52 is then encased within an insulative jacket 54 which comprises one or more layers of heat insulating material which permits a user to grasp the dispensing unit 50 and remove it from the microwave oven. For example, in the particular embodiment illustrated, the insulative jacket 54 comprises an outer insulating sheath 70, an intermediate insulating layer 72, and an inner insulating layer 74. The outer insulating sheath 70 can include serrations or grooves (not shown) to facilitate heat dissipation and grasping by a user, and is preferably formed of a flexible, heat insulating material such as a polyethylene, polypropylene, polyimide, or polystyrene foam. Of course, other materials with flexible, resilient insulative capabilities can also be used. The inner insulating layer 74 and the intermediate insulating layer 72 may also be formed from flexible, resilient, heat insulating materials. For example, the inner insulating material 74 may be formed in the shape of a tube from fiberglass mat, fiberglass filled high-temperature injected molded thermoplastic, or molded silicone. The intermediate insulating 72 can likewise be formed from material such as non-woven fiberglass and other insulative materials. Furthermore, as mentioned previously, any one or more of the layers of the insulative jacket may comprise a non-insulative material so long as at least one layer comprises an insulating material.

Finally, in the embodiment shown in FIGS. 5 through 7, the dispensing unit 50 also comprises nozzle 52 having an outlet 61 through which the first material 58 may be dispensed, as well as a base 76 which maintains the dispensing unit 50 in an upright orientation (nozzle pointed upward) while the dispenser is being heated in the microwave oven or is not being used. The base 76 may be molded separately from other heat-resistant materials, for example polypropylene. Alternatively, the base 76 can be removeably attached to the insulative jacket 54, such as by a hinge or a threaded connection (not shown), to allow replacement dispensers 52 to be inserted into the bottom of the insulative jacket 54 for reuse.

Again, with the hot melt adhesive, it is believed important to leave the nozzle 61 uncovered so that the hot melt adhesive can be readily applied to an object after the adhesive is heated and to avoid buildup of pressure with the dispenser 52. Maintaining the dispenser 52 in an upright orientation prevents hot melt adhesive from dripping from the dispenser during the heating process. However, the outer insulating layer 70 can also be formed slightly higher than the intermediate insulating layer 72, such that any dripping of the hot melt adhesive from the nozzle 61 is contained within the intermediate insulating layer and prevented from dripping down the outer surface of the cover.

Figures 8, 9, 10:
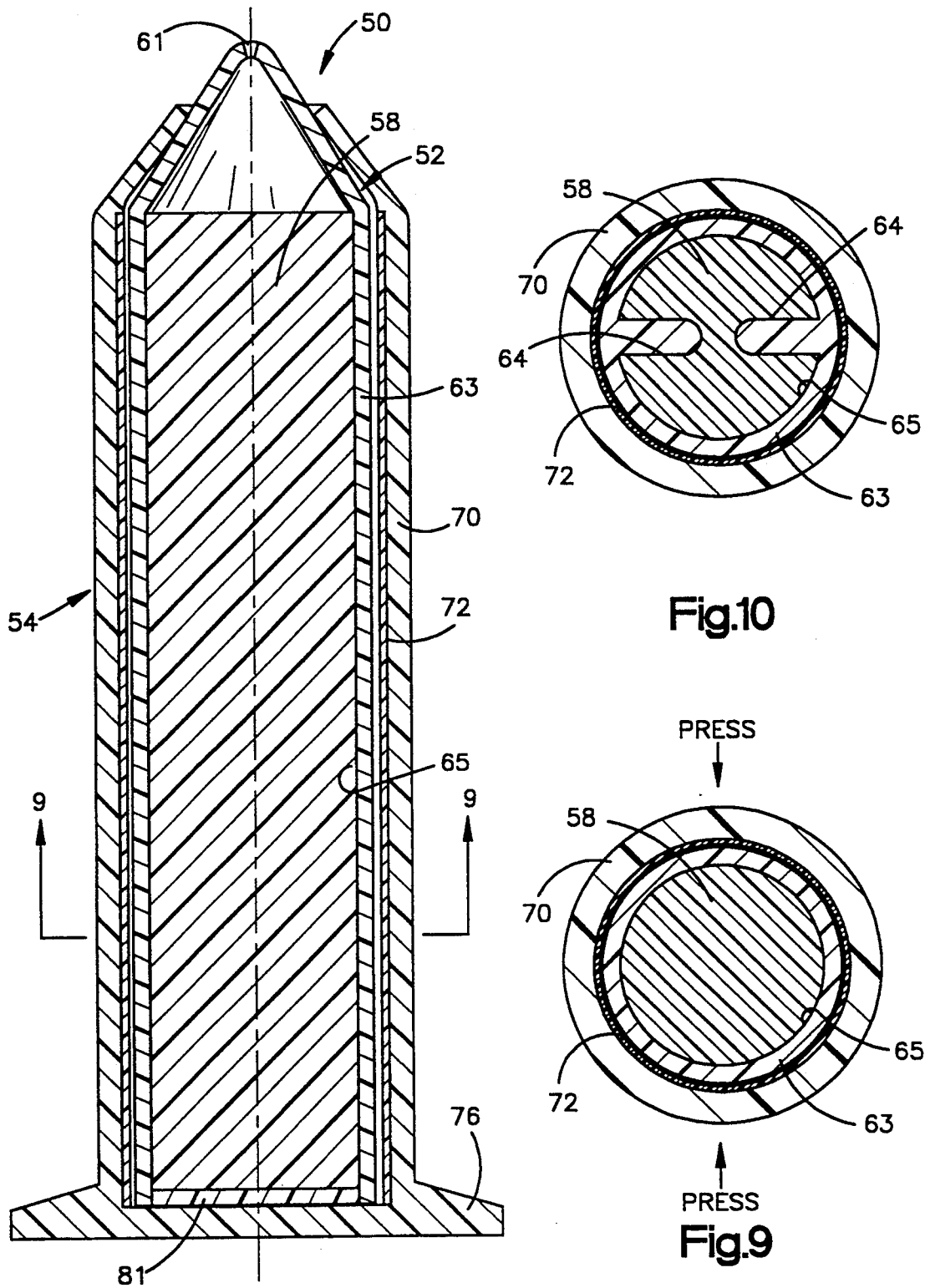
FIG. 8 is a cross-sectional side view of a dispenser and cover similar to that shown in FIG. 6, but showing the dispenser constructed according to an additional form of the present invention.
FIG. 9 is a cross-sectional top view of the dispenser of FIG. 8 taken along line 9—9.
FIG. 10 is a cross-sectional top view of the dispenser of FIG. 8, but showing a pair of ribs extending radially inward along opposite sides of the molded tube.

A further embodiment of the dispensing unit 50 manufactured in accordance with the practice of the present invention is as shown in FIGS. 8 and 9. Here, the dispensing unit 50 comprises an insulative jacket 54 in which is contained the dispensing unit 52. As described above, the insulative jacket 54 may comprise a plurality of insulating layers 70 and 72. The dispenser 52 comprises a container 63 in which is enclosed the first material 58 and an end plug 81. In one embodiment, the inner surface of the container 63 may be coated with a susceptor material 65. Alternatively, and preferably, the container 63 comprises a high temperature thermoplastic resin in which is dispersed the second material. In this instance, if desired, an interlayer 65, comprising a high-temperature, heat transmissive polymeric film 65, may act as a chemical barrier between the container 63 and the first material 58. Alternatively, no such interlayer may be used.

FIG. 9 shows a cross-section of the dispensing unit 50 of FIG. 8 taken along the line 9—9. Again, this drawing illustrates the first material 58 contained within the container 63 which, in itself, is contained within an inner insulative layer 72 and an outer insulative layer 70. Once the dispensing unit has been heated in a microwave oven for a sufficient period of time to effect the transformation or activation of the first material 58, one merely applies inward pressure to the dispensing unit so as to force the dispensing of the first material 58 through outlet 61.

The container 63 for the dispenser 52 manufactured in accordance with this embodiment of the present invention is preferably a resilient, flexible, thermoplastic or silicone rubber. Where the container 63 also comprises the susceptor for the hot melt dispenser 52, the microwave absorbing particles are dispersed within the polymer matrix making up the container 63. Exemplary of materials suitable for this purpose include carbon black filled silicone and ferrite filled silicone.

A more highly efficient and fast acting iteration of the dispensing unit 50 depicted in FIGS. 8 and 9 is that of the type shown in FIG. 10. Specifically, FIG. 10 shows a cross-section of a dispensing unit 50, similar to that shown in FIG. 8, except that it comprises two ribs 64 extending from the inner surface of the container 63 and running along the inside of the container in a direction parallel to the longitudinal axis of the container. As with the prior embodiment, the surface of the ribs 64, as well as the interior surface of the container 63, may have deposited thereon a susceptor material 65. Alternatively, the container 63 and the ribs 64 may be composed of a second material which comprises a polymer matrix having dispersed therein the microwave absorbing particles. Here again, dispensing of the first material 58 from the dispenser 52 through outlet 61 is effected by applying pressure to the outer surface of the insulative cover 54 essentially as shown by the arrows in FIG. 10. The use of radially opposed ribs in the construction of this embodiment of the dispenser 52 allows for maximum dispensing of the first material 58.

The improved efficiency in the heating of the first material 58 brought about by the use of the ribs 64 is evident from the results shown in Table 1. Specifically, Table 1 shows heat up rates for a dispenser manufactured using the standard tube configuration of FIGS. 8 and 9 and the ribbed tube configuration of FIG. 10 with two different types of ferrite susceptors.

One can see from these results that the contribution of resistive heating is significant. Here, ferrite B has a lower saturation magnetization than ferrite A yet reaches a significantly higher temperature for any given time of microwave exposure. Also, the temperatures reported for all cases, except ferrite A at 2 minutes, exceed the reported Curie temperature of the material. This may be the combined result of different manganese concentrations as well as sintering/production schedules causing the extent of resistive heating to vary with manufacturer. Also, the reported magnetization saturation and Curie temperatures are not exact.

Each dispenser was manufactured by injection molding from an injection molding grade silicone rubber, available from Ronsil Rubber, having 40% by weight of the identified ferrite materials incorporated therein. A standard EVA hot melt adhesive was encased within the silicone tube and the tube heat crimped at its end to prevent loss of the hot melt adhesive upon heating. The dispensers were then subjected to microwave energy and the internal temperature of the hot melt adhesive monitored over time using a probe.

TABLE 1

|  | 1 | 2 | 3 | 4 |
| --- | --- | --- | --- | --- |
| Ferrite Type | A[1] | A[1] | B[2] | B[2] |
| Tube Configuration | STD | Ribbed | STD | Ribbed |
| Heat-Up Rate+ °F. | | | | |
| 2 minutes | 203 | 319 | 302 | 343 |
| 3 minutes | 273 | 398 | 365 | 418 |
| 4 minutes | 314 | 421 | 395 | 461 |

[1]P.T. FCX 3242 from Powder Technology of Valparaiso, CA, a Mn/Zn modified ferrite having magnetic saturation of 5000 gauss and a Curie Temperature of 240° C.
[2]Fair-Rite 77 from Fair-Rite Products of Wall Kill, NY, a Mn/Zn modified ferrite having magnetic saturation of 4600 gauss and a Curie Temperature of 200° C.
+Maximum Glue Temperature A final further embodiment of the apparatus of the present invention is as shown in FIGS. 11 and 12. Specifically, this embodiment depicts a dispensing unit 50 in which the second material, or the susceptor, comprises a heating rod 80 embedded or encased within the first material 58. The heating rod 80 may comprise a substrate upon which the second material is coated or the heating rod 80 may comprise the second material in which case the heating rod is produced from a polymeric material having dispersed therein a susceptor material. FIG. 12 shows a cross-section of the dispensing unit 50 of FIG. 11 taken along line 12—12. In accordance with this embodiment, the container 63 may be injection molded from a thermoplastic material or silicone rubber which may or may not have dispersed within itself additional amounts of the second material. Furthermore, this embodiment also contemplates that the inner surface of the container 63 may have coated thereon a layer of the second material. Generally, though, the presence of the second material is only necessary in the heating rod 80. When the dispensing unit 50 is in this configuration, heating of the first material 58 occurs from the inside out. This manner of heating further reduces the temperature attained on the exterior surface of the container 63. In this light, it is possible that container 63 may be composed of a microwave transmissive, heat-insulating material. Such an embodiment may eliminate the need for the insulative sleeve 54.

As with the embodiment shown in FIG. 8, the dispensing unit 50 further includes a base 76 which can be removeably attached to the insulative jacket 54.

The present invention is not to be limited by the embodiments described in the description or as illustrated in the attached drawings. Rather, these embodiments are given by way of example and not limitation. Various alternative embodiments and modifications to the embodiments described and illustrated herein can be devised by those skilled in the art, in view of the present teaching, without departing from the invention. Accordingly, the present invention is intended to embrace all such alternative embodiments and modifications as may be deemed to fall within the scope of the appended claims.

We claim:

1. Apparatus for dispensing heat sensitive materials comprising:
   i) a first material which upon heating to a predetermined temperature is either transformed from a solid state or state of high viscosity to a liquid state or state of low viscosity or activated such that polymerisation or cure of the first material is initiated,
   ii) a second material which is designed to heat to at least the predetermined temperature when subjected to microwave energy for at least a predetermined period of time, said second material also being in a heat transfer relationship with, but not dispersed within, said first material,
   iii) a container within which the first material is disposed and which may either comprise or contain the second material, and
   iv) an outlet through which said first material is to be dispensed following exposure of the apparatus to microwaves;
   wherein the second material comprises a ferromagnetic material having a minimum Curie temperature at least equal to the predetermined temperature and a maximum Curie temperature which is lower than the temperature at which the first material will boil or be adversely affected by the heat generated by the second material and lower than the ignition temperature of either the first material or the container.

2. The apparatus of claim 1 wherein the first material is a material which upon being heated to a predetermined temperature for a predetermined period of time is transformed from a solid state or state of high viscosity to a liquid state or state of low viscosity.

3. The apparatus of claim 2 wherein the first material is a hot melt adhesive.

4. The apparatus of claim 1 wherein the first material is a heat activated polymerisable composition.

5. The apparatus of claim 4 wherein the heat activated polymerisable composition is a thermosetting resin selected from the group consisting of epoxies, polyesters, polyurethanes, polybutadienes, cyanate esters, bismaleimides, polyimides, phenolics, alkyds, amino resins and silicones.

6. The apparatus of claim 1 wherein the ferromagnetic material has predominately magnetic heating characteristics.

7. The apparatus of claim 1 wherein the ferromagnetic material has substantially no electric or resistive heating characteristics.

8. The apparatus of claim 1 wherein the ferromagnetic material is essentially free of electric or resistive heating characteristics.

9. The apparatus of claim 1 wherein the second material comprises a high temperature polymeric film upon which particulate ferromagnetic particles are disposed.

10. The apparatus of claim 1 wherein the second material comprises particulate ferromagnetic particles dispersed within a high temperature polymeric material.

11. The apparatus of claim 10 wherein the high temperature polymeric material is a silicone rubber.

12. The apparatus of claim 1 wherein the ferromagnetic material is selected from ferrites, spinels and spinel ferrites.

13. The apparatus of claim 12 wherein the ferromagnetic material is a ferrite.

14. The apparatus of claim 12 wherein the ferromagnetic material is a spinel ferrite.

15. The apparatus of claim 1 wherein the container comprises the second material.

16. The apparatus of claim 15 wherein the container is essentially tube shaped, with a longitudinal axis, and contains at least one rib on its interior surface parallel to and extending inwardly towards the longitudinal axis of the tube.

17. The apparatus of claim 1 wherein the second material is present as a heating rod embedded or encased within the first material.

18. Apparatus for dispensing heat sensitive materials comprising:
   i) a first material which upon heating to a predetermined temperature is either transformed from a solid state or state of high viscosity to a liquid state or state of low viscosity or activated such that polymerisation or cure of the first material is initiated,
   ii) a second material which is designed to heat to at least the predetermined temperature when subjected to microwave energy for at least a predetermined period of time, said second material also being in a heat transfer relationship with, but not dispersed within, said first material,
   iii) a container having a longitudinal axis and within which the first material is disposed, said container either comprising the second material or within which the second material is also disposed, and having at least one rib on its interior surface parallel to and extending inwardly towards the longitudinal axis.

19. The apparatus of claim 18 wherein the container has two ribs, each rib on an opposing interior surfaces of the container.

20. The apparatus of claim 18 wherein the container comprises the second material which itself comprises particulate microwave absorbing materials dispersed within a polymer matrix.

21. The apparatus of claim 20 wherein the particulate microwave absorbing material is selected from the group consisting of metal particles, metal oxide particles, ceramic particles, and carbon particles.

22. The apparatus of claim 21 wherein the particulate material is metal particles selected from the group consisting of aluminum particles, iron particles, and stainless steel particles.

23. The apparatus of claim 21 wherein the particulate material is metal oxide particles selected from ferrites, spinels, and spinel ferrites.

24. The apparatus of claim 21 wherein the particulate material is carbon particles selected from graphites, carbon blacks, and carbon fibers.

25. The apparatus of claim 18 wherein the inner surface of the container and the surface of the ribs is coated with the second material.

26. The apparatus of claim 18 wherein the surface of the ribs is coated with the second material.

27. Apparatus for dispensing heat sensitive materials comprising:
   i) a first material which upon heating to a predetermined temperature is either transformed from a solid state or state of high viscosity to a liquid state or state of low viscosity or activated such that polymerisation or cure of the first material is initiated,
   ii) a second material which is designed to heat to at least the predetermined temperature when subjected to microwave energy for at least a predetermined period of time, said second material also being in a heat transfer relationship with, but not dispersed within, said first material,
   iii) a container having a longitudinal axis and within which the first material is disposed and which may either comprise or contain the second material, and
   iv) an outlet through which said first material is to be dispensed following exposure of the apparatus to microwaves;
wherein the second material is present in the form of a heating rod, said heating rod having a longitudinal axis parallel to the axis of the container and being encased or embedded within the first material.

28. The apparatus of claim 27 wherein the heating rod comprises a particulate microwave absorbing material dispersed.

29. The apparatus of claim 28 wherein the particulate microwave absorbing material is dispersed within a polymer matrix.

30. The apparatus of claim 28 wherein the particulate microwave absorbing material is embedded upon a substantially non-microwave absorbing substrate.

31. The apparatus of claim 28 wherein the particulate microwave absorbing material is selected from the group consisting of metal particles, metal oxide particles, ceramic particles, and carbon particles.

32. The apparatus of claim 31 wherein the particulate material is metal particles selected from the group consisting of aluminum particles, iron particles, and stainless steel particles.

33. The apparatus of claim 31 wherein the particulate material is metal oxide particles selected from ferrites, spinels, and spinel ferrites.

34. The apparatus of claim 31 wherein the particulate material is carbon particles selected from graphites, carbon blacks, and carbon fibers.

35. Apparatus for dispensing heat sensitive materials comprising:
   i) a first material which upon heating to a predetermined temperature is either transformed from a solid state or state of high viscosity to a liquid state or state of low viscosity or activated such that polymerisation or cure of the first material is initiated,
   ii) a second material which is designed to heat to at least the predetermined temperature when subjected to microwave energy for at least a predetermined period of time, said second material also being in a heat transfer relationship with, but not dispersed within, said first material,
   iii) a container having a longitudinal axis and within which the first material is disposed and which may either comprise or contain the second material,
   iv) an outlet through which said first material is to be dispensed following exposure of the apparatus to micro waves, and
   v) a microwave transparent, insulative jacket substantially encasing the container.

36. The apparatus of claim 35 wherein the insulative jacket comprises at least one layer of an insulating material.

37. The apparatus of claim 36 wherein the at least one layer of insulating material is a polymeric foam.

38. The apparatus of claim 36 wherein the insulative jacket comprises at least two layers including an exterior layer, one of which, but not the exterior layer, is either fiberglass or fiberglass mat.

39. The apparatus of claim 35 wherein the insulative jacket is adhered to the container.

40. The apparatus of claim 35 wherein the insulative jacket forms a reuseable sleeve into which the container is inserted and withdrawn.

41. The apparatus of claim 35 wherein the insulative jacket comprises a non-insulative exterior layer.

42. Apparatus for dispensing heat sensitive materials comprising:
   i) a first material which upon heating to a predetermined temperature is either transformed from a solid state or a state of high viscosity to a liquid state or state of low viscosity or activated such that polymerization or cure of the first material is initiated,
   ii) a second material which is designed to heat to at least the predetermined temperature when subjected to microwave energy for at least a predetermined period of time, said second material also being in a heat transfer relationship with, but not dispersed within, said first material,
   iii) a container within which the first material is disposed and which may either comprise or contain the second material,
   iv) an outlet through which said first material is to be dispensed following exposure of the apparatus to microwaves; and
   v) a microwave transparent, insulative jacket substantially encasing the container; wherein the second material comprises a ferromagnetic material having a minimum Curie temperature at least equal to the predetermined temperature and a maximum Curie temperature which is lower than the temperature at which the first material will boil or be adversely affected by the heat generated by the second material and lower than the ignition temperature of either the first material or the container.

43. The apparatus of claim 42 wherein the ferromagnetic material is selected from ferrites, spinels, and spinel ferrites.

44. The apparatus of claim 43 wherein the ferromagnetic material has predominately magnetic heating characteristics.

45. The apparatus of claim 42 wherein the insulative jacket comprises at least one layer of an insulating material.

46. The apparatus of claim 45 wherein the at least one layer of insulating material is an insulating foam.

47. The apparatus of claim 45 wherein the insulative jacket comprises at least two layers including an exterior layer, one of which, but not the exterior layer, is either fiberglass or fiberglass mat.

48. The apparatus of claim 47 wherein the insulative jacket comprises a non-insulative exterior layer.

* * * * *